United States Patent
Chen (10) Patent No.: US 9,713,193 B2
(45) Date of Patent: Jul. 18, 2017

(54) APPARATUSES AND METHODS FOR REDUCING PAGING FOR EXTENDED DISCONTINUOUS RECEPTION (EDRX) MOBILE STATION (MS) TO RECEIVE MOBILE TERMINATED (MT) SHORT MESSAGES (SM)

(71) Applicant: Acer Incorporated, New Taipei (TW)

(72) Inventor: Pei-Jung Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/137,442

(22) Filed: Apr. 25, 2016

(65) Prior Publication Data

US 2017/0127469 A1  May 4, 2017

Related U.S. Application Data

(60) Provisional application No. 62/249,646, filed on Nov. 2, 2015.

(51) Int. Cl.
  *H04W 4/00* (2009.01)
  *H04W 76/04* (2009.01)
  *H04W 4/12* (2009.01)

(52) U.S. Cl.
  CPC ........... *H04W 76/048* (2013.01); *H04W 4/12* (2013.01)

(58) Field of Classification Search
  USPC .......... 455/418–420, 436–439, 456.1–456.3, 455/458, 466, 574; 370/329–334
  See application file for complete search history.

(56) References Cited

U.S. PATENT DOCUMENTS

2012/0276876 A1* 11/2012 Karaoguz ............... H04M 3/53
                                                                455/412.1
2014/0016614 A1    1/2014 Velev et al.
(Continued)

FOREIGN PATENT DOCUMENTS

WO    WO 2015/005853 A2    1/2015

OTHER PUBLICATIONS

European Search Report dated Apr. 19, 2017, issued in application No. 16170896.1-1505.
(Continued)

*Primary Examiner* — Dai A Phuong
(74) *Attorney, Agent, or Firm* — McClure, Qualey & Rodack, LLP (57) ABSTRACT

A Serving GPRS Support Node (SGSN) including a controller and a non-transitory computer readable storage medium is provided. The non-transitory computer readable storage medium stores instructions which, when executed by the controller, cause the controller to perform steps including: receiving a signaling request message from a mobile communication device via an access network, determining whether the mobile communication device operates in an idle mode with Extended Discontinuous Reception (EDRX) and whether there is any Mobile Terminated (MT) Short Message (SM) pending for the mobile communication device, in response to receiving the signaling request message, and transmitting a signaling response message indicating the pending of the MT SM to the mobile communication device via the access network in response to the mobile communication device being configured to operate in the idle mode with EDRX and there being at least one MT SM pending for the mobile communication device.

12 Claims, 7 Drawing Sheets

(56) References Cited

U.S. PATENT DOCUMENTS

| | | | | |
|---|---|---|---|---|
| 2015/0103710 A1* | 4/2015 | Lv | .................... | H04W 74/0816 |
| | | | | 370/311 |
| 2015/0327032 A1* | 11/2015 | Hedman | ............ | H04W 76/046 |
| | | | | 370/329 |
| 2015/0334648 A1* | 11/2015 | Ansari | ............. | H04W 52/0216 |
| | | | | 370/311 |
| 2016/0205625 A1* | 7/2016 | Stojanovski | ...... | H04W 52/0212 |
| | | | | 370/311 |
| 2016/0242231 A1* | 8/2016 | Vajapeyam | ......... | H04W 76/048 |
| 2016/0262041 A1* | 9/2016 | Ronneke | ........... | H04W 52/0216 |
| 2016/0295504 A1* | 10/2016 | Wang | .................... | H04W 52/02 |
| 2016/0345292 A1* | 11/2016 | Ljung | ............... | H04W 36/0083 |

OTHER PUBLICATIONS

"3rd Generation Partnership Project; Technical Specification Group Services and System Aspects; Study on Machine-Type Communications (MTC) and other mobile data applications communications enhancements (Release 12);" Dec. 2013; pp. 1-151.

"Updated conclusion of extended DRX solutions;" SA WG2 Meeting #100; Nov. 2013; pp. 1-10.

"3rd Generation Partnership Project; Technical Specification Group Services and System Aspects; Study on system Impacts of extended Discontinuous Reception (DRX) cycle for power consumption optimization (Release 13);" Sep. 2015; pp. 1-42.

"Indicate follow-on proceed in routing area update accept for stored MT SMS of eDRX MS;" 3GPP TSG-CT WG1 Meeting #95; Nov. 2015; pp. 1-4.

Chinese language office action dated May 24, 2017, issued in application No. TW 105121070.

"3GPP TR 23. 770 V13.0 .0; Technical Specification Group Services and System Aspects; Study on system impacts of extended Discontinuous Reception (DRX) cycle for power consumption optimization; Release 13);" Sep. 22, 2015; pp. 1-4.

"3GPP TR 23. 272 V13. 1.0; Technical Specification Group Services and System Aspects; Circuit Switched (CS) fallback in Evolved Packet System (EPS); Stage 2; (Release 13);" Sep. 22, 2015; pp. 1-4.

* cited by examiner

APPARATUSES AND METHODS FOR REDUCING PAGING FOR EXTENDED DISCONTINUOUS RECEPTION (EDRX) MOBILE STATION (MS) TO RECEIVE MOBILE TERMINATED (MT) SHORT MESSAGES (SM)

CROSS REFERENCE TO RELATED APPLICATIONS

This Application claims priority of U.S. Provisional Application No. 62/249,646, filed on Nov. 2, 2015, the entirety of which is incorporated by reference herein.

BACKGROUND OF THE APPLICATION

Field of the Application

The application generally relates to Short Message (SM) delivery in a wireless communication environment, and more particularly, to apparatuses and methods for reducing paging for Extended Discontinuous Reception (EDRX) Mobile Station (MS) to receive Mobile Terminated (MT) SMs.

Description of the Related Art

With growing demand for ubiquitous computing and networking, various wireless technologies have been developed, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and Time-Division LTE (TD-LTE) technology, etc.

Taking the WCDMA technology as an example: the technique called Extended Discontinuous Reception (EDRX) was first introduced for saving power in release 12 of the 3rd Generation Partnership Project (3GPP) specification TR 23.770. The EDRX aims to extend the DRX cycle for a longer period of time, in which a Mobile Station (MS) only has to stay active for a very short time and then enters the inactive state for the rest of the time in the DRX cycle. This greatly reduces power consumption of the MS, especially when the MS is a Machine Type Communication (MTC) device which is powered by a battery and most of the time, it's hard to charge or replace the battery.

For example, the length of an EDRX cycle may be configured from 30 seconds to several minutes long. However, there may be a situation where many SMs terminated for the MS may arrive in the inactive duration (or may be referred to as sleep or "OFF" duration) of the EDRX cycle. Conventionally, the MT SMs will be queued in the Short Message Service (SMS) center in the WCDMA network. When the MS enters the active state (or may be referred to as "ON" duration) from the inactive state, the WCDMA network may page the MS and send the queued SMs to the MS. That is, the conventional design requires certain paging resources of the WCDMA network, not to mention that the delivery of the MT SMs may be greatly delayed due to the long inactive duration of EDRX.

Thus, it is desirable to have a more efficient way of delivering MT SMs to an MS operating in the EDRX mode.

BRIEF SUMMARY OF THE APPLICATION

In a first aspect of the application, a Serving GPRS (General Packet Radio Service) Support Node (SGSN) is provided. The SGSN comprises a controller and a non-transitory computer readable storage medium. The non-transitory computer readable storage medium stores instructions which, when executed by the controller, cause the controller to perform steps comprising: receiving a signaling request message from a mobile communication device via an access network, determining whether the mobile communication device operates in an idle mode with Extended Discontinuous Reception (EDRX) and whether there is any Mobile Terminated (MT) Short Message (SM) pending for the mobile communication device, in response to receiving the signaling request message, and transmitting a signaling response message indicating the pending of the MT SM to the mobile communication device via the access network in response to the mobile communication device being configured to operate in the idle mode with EDRX and there being at least one MT SM pending for the mobile communication device.

In a second aspect of the application, a method for an SGSN to reduce paging for a mobile communication device operating in an idle mode with EDRX to receive an MT SM is provided. The method comprises the steps of: receiving a signaling request message from a mobile communication device via an access network; determining whether the mobile communication device operates in an idle mode with EDRX and whether there is any MT SM pending for the mobile communication device, in response to receiving the signaling request message; and transmitting a signaling response message indicating the pending of the MT SM to the mobile communication device via the access network in response to the mobile communication device being configured to operate in the idle mode with EDRX and there being at least one MT SM pending for the mobile communication device.

In a third aspect of the application, a mobile communication device is provided. The mobile communication device comprises a wireless transceiver and a controller. The wireless transceiver performs wireless transmission and reception to and from a service network comprising an SGSN. The controller transmits a signaling request message to the SGSN via the wireless transceiver when operating in an idle mode with EDRX, receives a signaling response message, which indicates that there is at least one MT SM pending for the mobile communication device, from the SGSN via the wireless transceiver, and stays in an active state for receiving the pending MT SM from the service network via the wireless transceiver, in response to the signaling response message indicating that there is at least one MT SM pending for the mobile communication device.

In a fourth aspect of the application, a method for a mobile communication device operating in an idle mode with EDRX to receive an MT SM is provided. The method comprises the steps of: transmitting a signaling request message to an SGSN when configured to operate in the idle mode with EDRX; receiving a signaling response message, which indicates that there is at least one MT SM pending for the mobile communication device, from the SGSN; and staying in an active state for receiving the pending MT SM from the service network via the wireless transceiver, in response to the signaling response message indicating that there is at least one MT SM pending for the mobile communication device.

Other aspects and features of the invention will become apparent to those with ordinary skill in the art upon review of the following descriptions of specific embodiments of the SGSNs, mobile communication devices, and methods for reducing paging for an EDRX MS to receive an MT SM.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3GPP specifications are used to teach the spirit of the application, and the application is not limited thereto.

Figure 1:
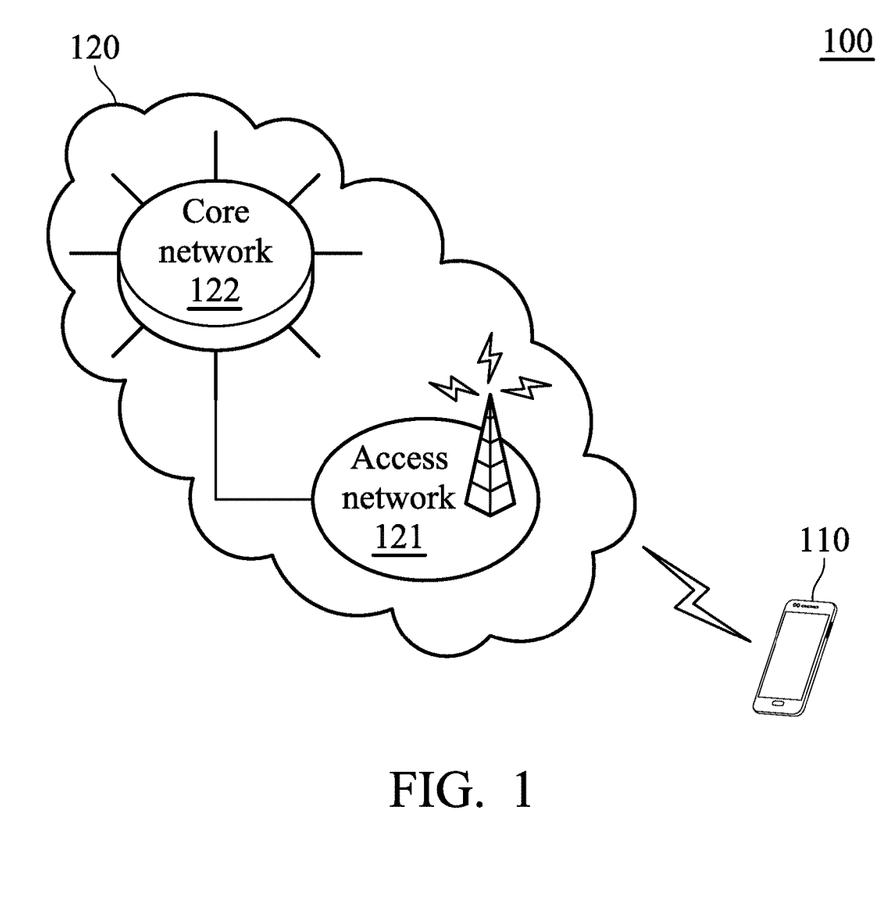
FIG. 1 is a block diagram of a wireless communication environment according to an embodiment of the application.

FIG. 1 is a block diagram of a wireless communication environment according to an embodiment of the application. The wireless communication environment 100 comprises a mobile communication device 110 and a service network 120, wherein the mobile communication device 110 is wirelessly connected to the service network 120 for obtaining mobile services. The mobile communication device 110 may be referred to as an MS, such as a feature phone, a smartphone, a panel Personal Computer (PC), a laptop computer, or any computing device supporting the wireless technology utilized by the service network 120. In one embodiment, the mobile communication device 110 may be configured for MTC and run an application for MTC. For example, the mobile communication device 110 may be an MTC sensor employed to monitor the operation status of a certain facility, such as water treatment facility or bridge, or monitor biological information, such as blood pressure, body temperature, and/or heart rate of the wearer, and report measurement results back to control centers.

The service network 120 may a GPRS network, an EDGE network, or a WCDMA network. Specifically, the service network 120 comprises an access network 121 and a core network 122, wherein the access network 121 is responsible for processing radio signals, terminating radio protocols, and connecting the mobile communication device 110 with the core network 122, while the core network 122 is responsible for performing mobility management, network-side authentication, and interfaces with public/external networks (e.g., the Internet). Each of the access network 121 and the core network 122 may comprise one or more network nodes for carrying out said functions. For example, if the service network 120 is a GPRS/EDGE network, the access network 121 may be a Base Station Subsystem (BSS) which includes at least a Base Transceiver Station (BTS) and a Base Station Controller (BSC), and the core network 122 may be a GPRS core, which includes a Home Location Register (HLR), at least one Serving GPRS Support Node (SGSN), at least one Gateway GPRS Support Node (GGSN), and a Short Message Service Center (SMSC). Alternatively, if the service network 120 is a WCDMA network, the access network 121 may be a Universal Terrestrial Radio Access (UTRAN) which includes at least a NodeB and a Radio Network Controller (RNC), and the core network 122 may be a GPRS core, which includes an HLR, at least one SGSN, at least one GGSN, and an SMSC.

Figure 2:
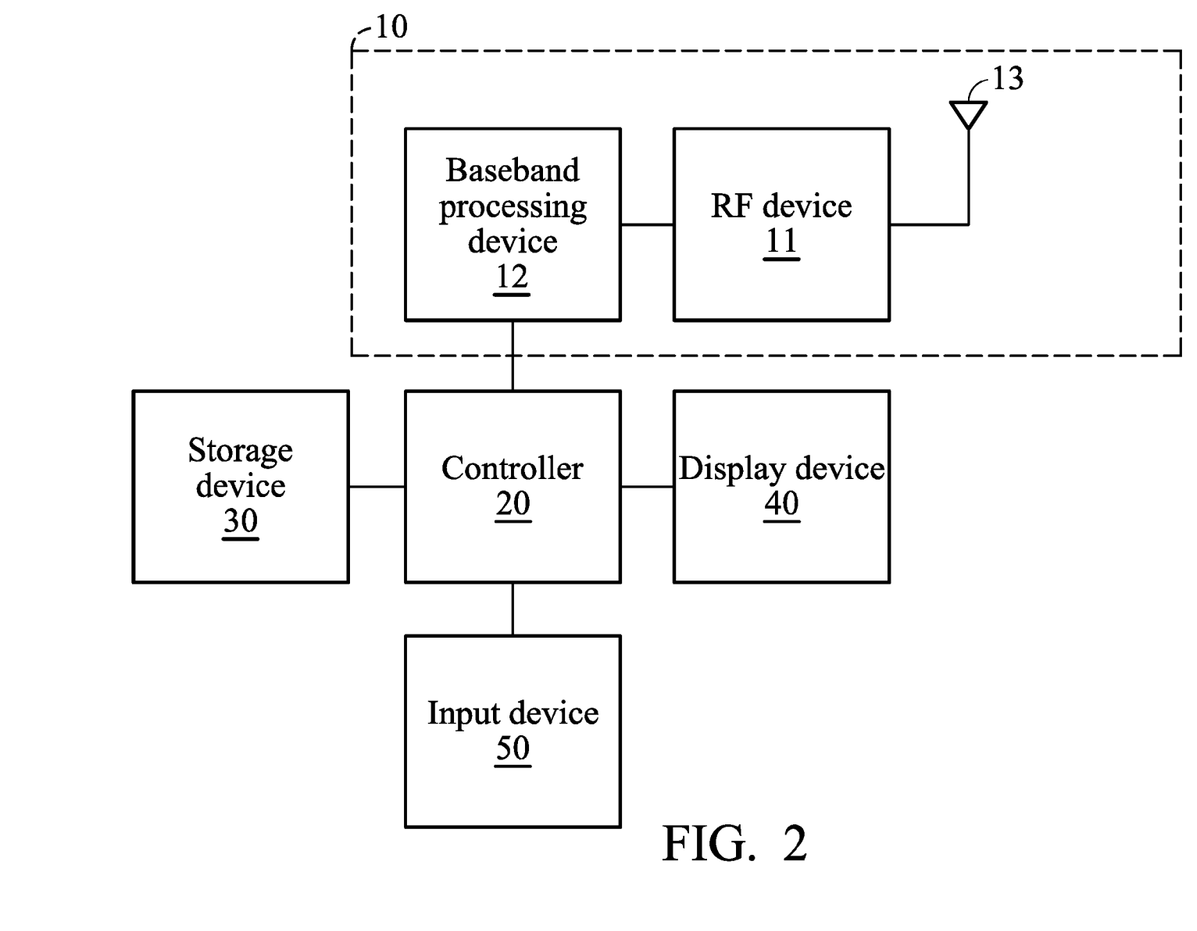
FIG. 2 is a block diagram illustrating the mobile communication device 110 according to an embodiment of the application.

FIG. 2 is a block diagram illustrating the mobile communication device 110 according to an embodiment of the application. The mobile communication device 110 comprises a wireless transceiver 10, a controller 20, a storage device 30, a display device 40, and an input device 50. The wireless transceiver 10 is configured to perform wireless transmission and reception to and from the service network 120. The wireless transceiver 10 comprises a Radio Frequency (RF) device 11, a baseband processing device 12, and an antenna 13. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may comprise a mixer to multiply the baseband signals with a carrier oscillated in the radio frequency of the supported wireless technology, wherein the radio frequency may be 900 MHz, 1800 MHz or 1900 MHz utilized in GPRS/EDGE technology, or may be 900 MHz, 1900 MHz, or 2100 MHz utilized in WCDMA systems, or another radio frequency, depending on the wireless technology in use.

The controller 20 may be a general-purpose processor, a Micro Control Unit (MCU), an application processor, a Digital Signal Processor (DSP), or the like, which includes various circuitry for providing the function of data processing and computing, controlling the wireless transceiver 10 for wireless communications with the service network 120, storing and retrieving data to and from the storage device 30, sending a series of frame data (e.g. representing text messages, graphics, images, etc.) to the display device 40, receiving signals from the input device 50. In particular, the controller 20 coordinates the aforementioned operations of the wireless transceiver 10, the storage device 30, the display device 40, and the input device 50 for performing the method of the present application.

As will be appreciated by persons skilled in the art, the circuitry for performing such a method will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

In another embodiment, the controller 20 may be incorporated into the baseband processing device 12, serving as a baseband processor.

The storage device 30 is a non-transitory machine-readable storage medium, including a memory, such as a FLASH memory or a Non-volatile Random Access Memory (NVRAM), or a magnetic storage device, such as a hard disk or a magnetic tape, or an optical disc, or any combination thereof for storing instructions and/or program code of applications, communication protocols, and/or the method of the present application.

The display device 40 may be a Liquid-Crystal Display (LCD), Light-Emitting Diode (LED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MIMI) for interaction with users.

It should be understood that the components described in the embodiment of FIG. 2 are for illustrative purposes only and are not intended to limit the scope of the application. For example, the mobile communication device 110 may further comprise a power supply, and/or a sensor for sensing the water level of a water facility, or sensing abnormal gas leaks in a gas pipe, or sensing biological information, such as blood pressure, body temperature, and/or heart rate, of a wearer.

Figure 3:
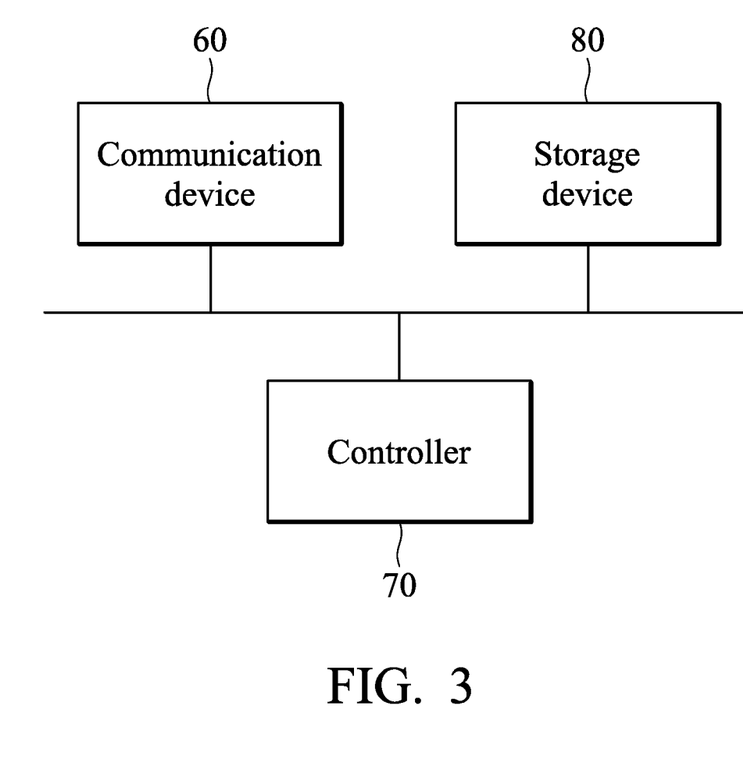
FIG. 3 is a block diagram illustrating an SGSN according to an embodiment of the application.

FIG. 3 is a block diagram illustrating an SGSN according to an embodiment of the application. The SGSN is responsible for the delivery of data packets from and to the mobile communication device 110 via the access network 121. Its tasks include packet routing and transfer, mobility management (attach/detach and location management), logical link management, and authentication and charging functions. The SGSN includes a communication device 60, a controller 70, and a storage device 80.

The communication device 60 provides wired links to other network nodes (e.g., BSC/RNC, and HLR) of the service network 120. In one embodiment, the communication device 60 may include a cable modem, an Asymmetric Digital Subscriber Line (ADSL) modem, a Fiber-Optic Modem (FOM), an Ethernet network interface, or another wired interface.

The controller 70 may be a general-purpose processor, an MCU, an application processor, a DSP, or the like, which includes various circuitry for providing the function of data processing and computing, controlling the operation of the communication device 60, and loading and executing a series of instructions and/or program codes from the storage device 80 to perform the method of the present application.

As will be appreciated by persons skilled in the art, the circuitry for performing such a method will typically include transistors that are configured in such a way as to control the operation of the circuitry in accordance with the functions and operations described herein. As will be further appreciated, the specific structure or interconnections of the transistors will typically be determined by a compiler, such as a RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 80 is a non-transitory computer readable storage medium, such as a memory (e.g., RAM, Flash memory, or NVRAM, etc.), a magnetic storage device (e.g., magnetic tape or hard disk), an optical storage device (e.g., CD-ROM), or any combination thereof for storing instructions and/or program codes of applications, communication protocols, and/or the method of the present application.

Although not shown, the SGSN may further include other functional units, such as an Input/Output (I/O) device (e.g., display device, button, keyboard, mouse, touch pad, touch screen, etc.), and the invention is not limited thereto.

Figure 4A:
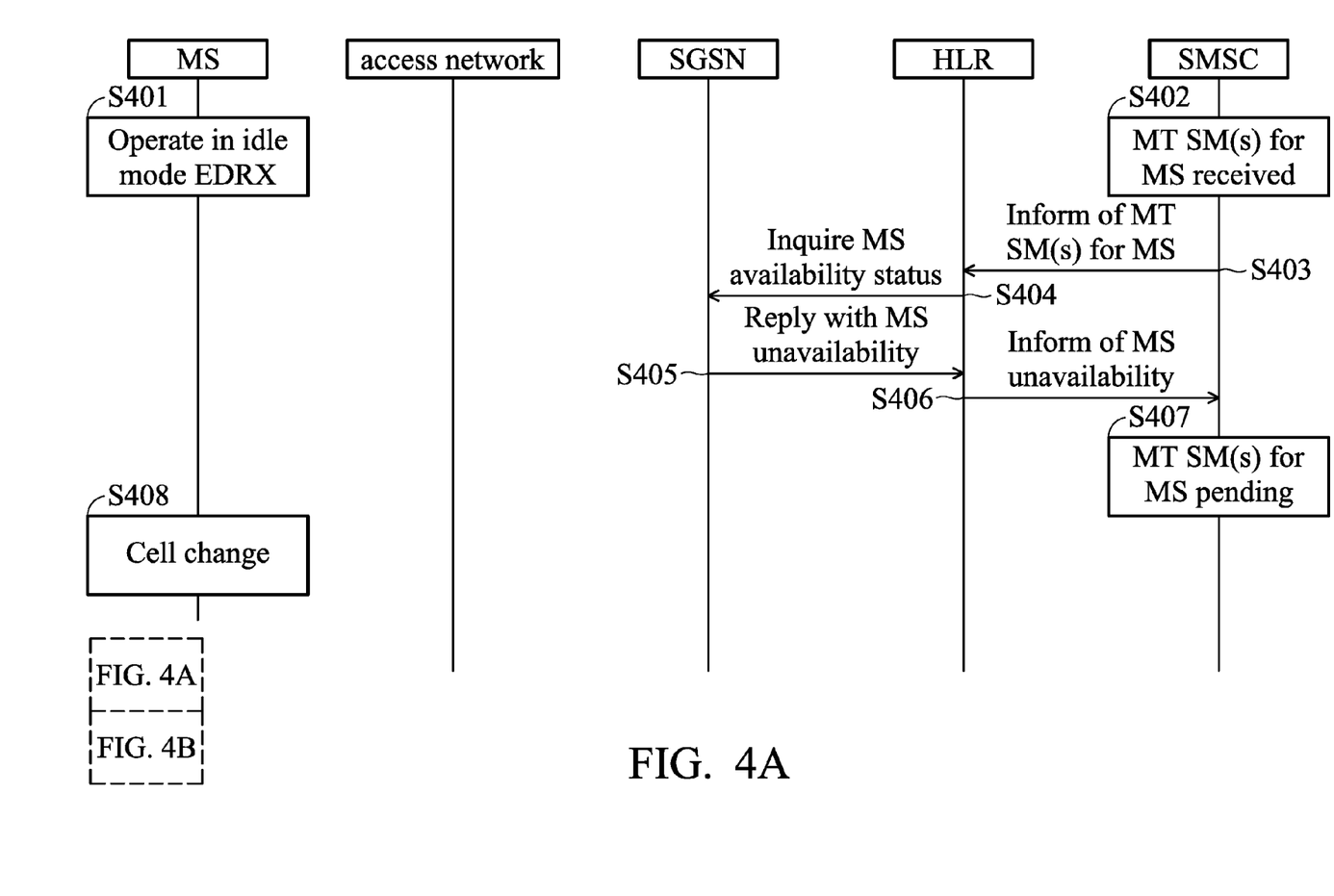
FIGS. 4A and 4B show a message sequence chart illustrating the method for reducing paging for an EDRX MS to receive an MT SM according to an embodiment of the application.
Figure 4B:
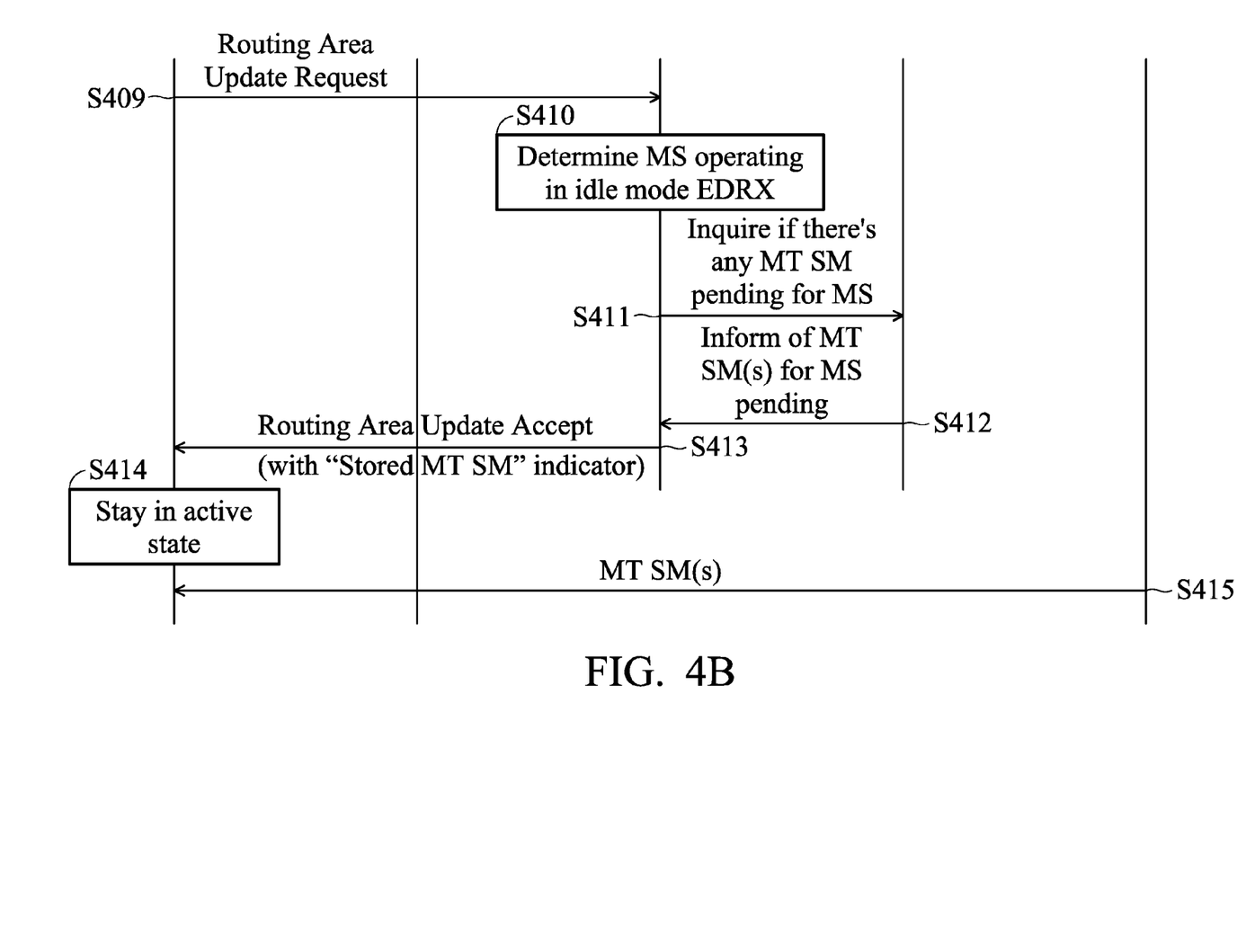

FIGS. 4A and 4B show a message sequence chart illustrating the method for reducing paging for an EDRX MS to receive an MT SM according to an embodiment of the application. To begin, the MS is configured to operate in the idle mode with EDRX (step S401). When the MS is in EDRX "OFF" duration, one or more MT SM for the MS is received in the SMSC (step S402). In response to the MT SM(s), the SMSC informs the HLR about the MT SM(s) for the MS (step S403). The HLR further inquires the SGSN about the availability status of the MS (step S404), and due to the MS being in an EDRX "OFF" duration, the HLR receives a reply from the SGSN, which indicates that the MS is not available right now (step S405). Next, the HLR informs the SMSC about the unavailability of the MS (step S406), so the SMSC holds the MT SM(s) pending (step S407).

Later, the location of the MS is updated, causing cell change (step S408). Upon the cell change, the MS initiates the routing area update procedure by transmitting a Routing Area Update Request message to the SGSN via the access network (step S409). When receiving the Routing Area Update Request message, the SGSN determines whether the MS is operating in the idle mode with EDRX (step S410), and if so, inquires the HLR about whether there is any MT SM pending for the MS (step S411). Subsequently, the SGSN receives a notification from the HLR, which indicates that there is MT SM(s) pending for the MS (step S412).

In one embodiment, the SGSN may check the stored Mobility Management (MM)/Packet Data Protocol (PDP)/Evolved Packet System (EPS) context to see if the DRX parameters or EDRX parameters therein indicates a long DRX/EDRX cycle (e.g., more than 30 seconds), and if so, it is determined that the MS is using EDRX.

In another embodiment, the HLR may inform the SGSN about the MT SM(s) for the MS, along with inquiring about the availability status of the MS in step S404, and the SGSN may keep the information of there being MT SM(s) pending for the MS. In this way, the SGSN may check the stored information to see if there is any MT SM(s) pending for the MS, and steps S411 and S412 may be skipped.

Subsequent to step S412, the SGSN transmits a Routing Area Update Accept message with a "Stored MT SM" indicator to the MS via the access network (step S413), wherein the "Stored MT SM" indicator indicates the pending of the MT SM(s).

In one embodiment, the SGSN may reuse the "follow-on proceed" field in the "Update Result" Information Element (IE) to carry the "Stored MT SM" indicator. In another embodiment, the SGSN may use the reserved bit in the "Update Result" IE to carry the "Stored MT SM" indicator.

In yet another embodiment, the SGSN may add a new IE in the Routing Area Update Accept message to carry the "Stored MT SM" indicator.

Subsequent to step S413, the MS stays in an active state, regardless of the configuration of the idle mode EDRX (step S414). That is, even if it's EDRX "OFF" duration now according to the EDRX configuration, the MS will not enter the sleep state and just stay active until the pending MT SM(s) is/are received. Next, the MS receives the pending MT SM(s) from the SMSC (step S415).

Please note that the routing area update procedure may involve other operations related to the updating of the routing area, but the detailed description thereof is omitted herein since it is beyond the scope of this application. For detailed description of the routing area update procedure, reference may be made to the 3GPP TS 24.008.

Figure 5A:
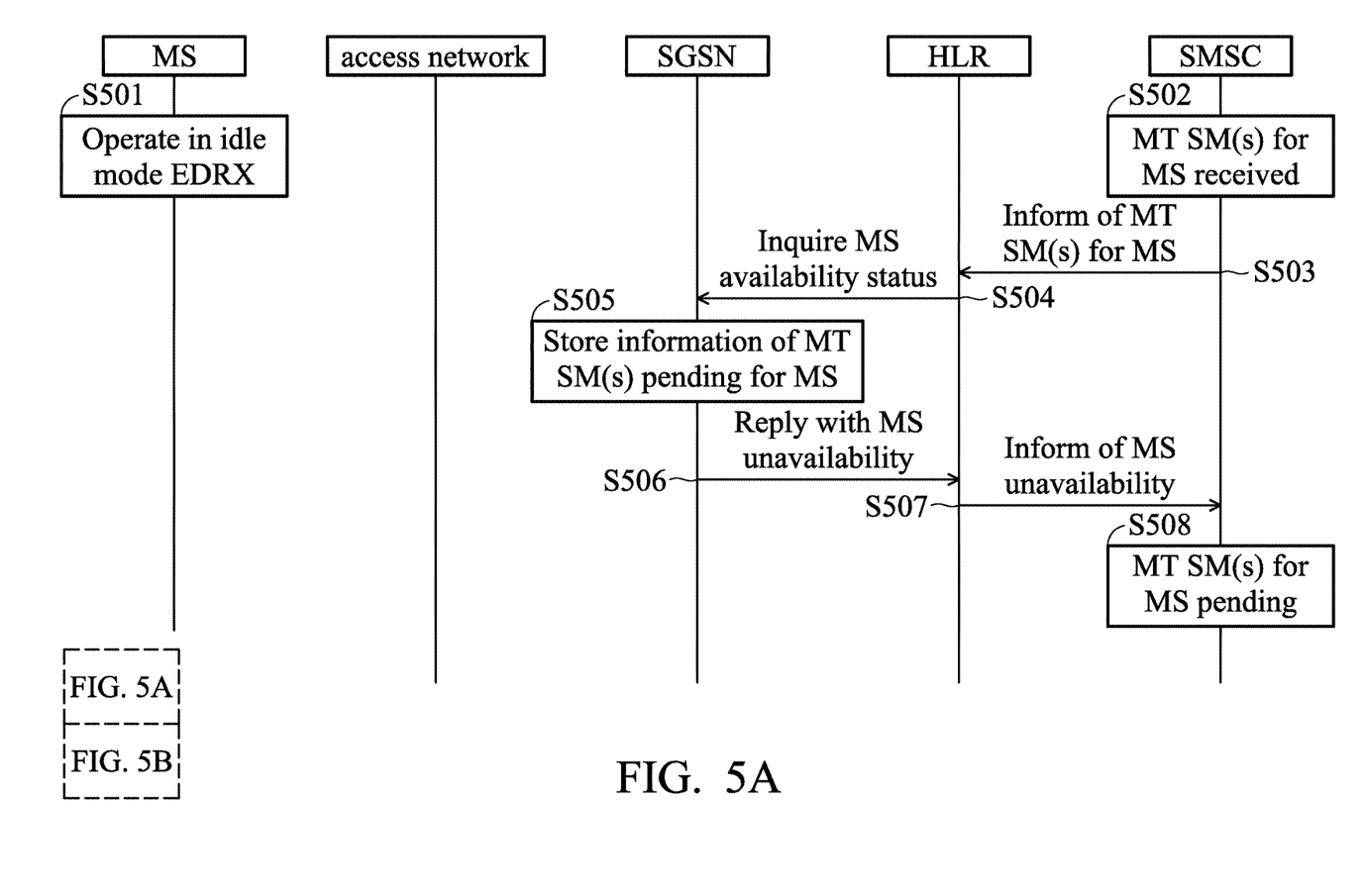
FIGS. 5A and 5B show a message sequence chart illustrating the method for reducing paging for an EDRX MS to receive an MT SM according to another embodiment of the application.
Figure 5B:
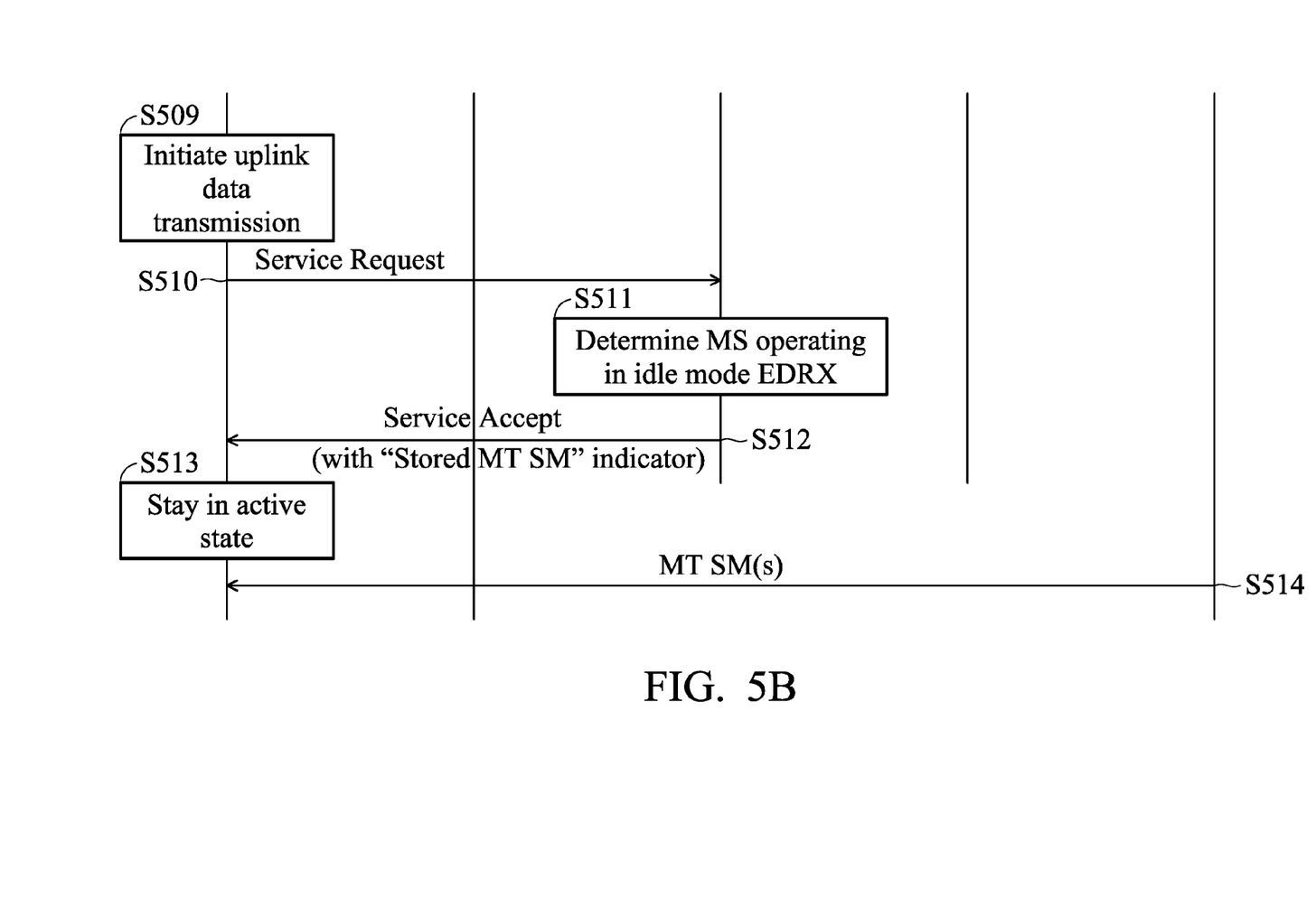

FIGS. 5A and 5B show a message sequence chart illustrating the method for reducing paging for an EDRX MS to receive an MT SM according to another embodiment of the application. As shown in FIG. 5, steps S501-S504 are similar to steps S401-S404 in the embodiment of FIG. 4, and detailed description is omitted herein for brevity. When inquired by HLR about the availability status of the MS, the SGSN determines that the MS is in an EDRX "OFF" duration, so it stores the information of there being MT SM(s) pending for the MS (step S505) and then replies to the HLR with a notification that the MS is not available right now (step S506). Next, the HLR informs the SMSC about the unavailability of the MS (step S507), so the SMSC holds the MT SM(s) pending (step S508).

Later, due to uplink data transmission being initiated (e.g., by an application) (step S509), the MS starts the service request procedure by transmitting a Service Request message to the SGSN via the access network (step S510). When receiving the Service Request message, the SGSN determines whether the MS is operating in the idle mode with EDRX (step S511), and if so, transmits a Service Accept message with a "Stored MT SM" indicator to the MS via the access network (step S512), due to the stored information indicating that there is/are MT SM(s) pending for the MS. The "Stored MT SM" indicator indicates the pending of the MT SM(s).

When receiving the Service Accept message, the MS stays in an active state, regardless of the configuration of the idle mode EDRX (step S513). That is, even if it's EDRX "OFF" duration now according to the EDRX configuration, the MS will not enter the sleep state and just stay active until the pending MT SM(s) is/are received. Next, the MS receives the pending MT SM(s) from the SMSC (step S514).

Please note that the service request procedure may involve other operations related to the handling of the service request, but the detailed description thereof is omitted herein since it is beyond the scope of this application. For detailed description of the service request procedure, reference may be made to the 3GPP TS 24.301.

In view of the forgoing embodiments of FIGS. 4A, 4B, 5A, and 5B, it will be appreciated that the present application realizes improved delivery of MT SM(s) for MS operating in idle mode EDRX by providing the option of informing the MS about pending MT SM(s) through the MS-initiated routing area update procedure and service request procedure. Advantageously, this may reduce paging resources of the service network and allow the MS operating in idle mode EDRX to receive the MT SM(s) as soon as possible.

While the application has been described by way of example and in terms of preferred embodiment, it is to be understood that the application is not limited thereto. Those who are skilled in this technology can still make various alterations and modifications without departing from the scope and spirit of this application. For example, the method for warning status reporting of the present application may be applied to any future evolution of the LTE-based technology. Therefore, the scope of the application shall be defined and protected by the following claims and their equivalents.

What is claimed is:

1. A Serving GPRS (General Packet Radio Service) Support Node (SGSN), comprising:
   a controller; and
   a non-transitory computer readable storage medium, storing instructions which, when executed by the controller, cause the controller to perform steps comprising: receiving a signaling request message from a mobile communication device via an access network, determining whether the mobile communication device operates in an idle mode with Extended Discontinuous Reception (EDRX) and whether there is any Mobile Terminated (MT) Short Message (SM) pending for the mobile communication device, in response to receiving the signaling request message, and transmitting a signaling response message indicating the pending of the MT SM to the mobile communication device via the access network in response to the mobile communication device being configured to operate in the idle mode with EDRX and there being at least one MT SM pending for the mobile communication device.

2. The SGSN of claim 1, wherein the steps further comprise: not transmitting, via the access network, a paging message to inform the mobile communication device of the pending MT SM.

3. The SGSN of claim 1, wherein the determination of whether there is an MT SM pending for the mobile communication device is performed by: inquiring a Home Location Register (HLR) about whether there is any MT SM pending for the mobile communication device, or receiving, from the HLR, a notification that there is at least one MT SM pending for the mobile communication device.

4. The SGSN of claim 1, wherein the signaling request message and the signaling response message are a Routing Area Update Request message and a Routing Area Update Accept message, respectively, or a Service Request message and a Service Accept message, respectively.

5. A method for a Serving GPRS (General Packet Radio Service) Support Node (SGSN) to reduce paging for a mobile communication device operating in an idle mode with Extended Discontinuous Reception (EDRX) to receive a Mobile Terminated (MT) Short Message (SM), the method comprising:
   receiving a signaling request message from a mobile communication device via an access network;
   determining whether the mobile communication device operates in an idle mode with EDRX and whether there is any MT SM pending for the mobile communication device, in response to receiving the signaling request message; and
   transmitting a signaling response message indicating the pending of the MT SM to the mobile communication device via the access network in response to the mobile communication device being configured to operate in the idle mode with EDRX and there being at least one MT SM pending for the mobile communication device.

6. The method of claim 5, further comprising:
not transmitting, via the access network, a paging message to inform the mobile communication device of the pending MT SM.

7. The method of claim 5, wherein the determination of whether there is an MT SM pending for the mobile communication device is performed by: inquiring a Home Location Register (HLR) about whether there is any MT SM pending for the mobile communication device, or receiving, from the HLR, a notification that there is at least one MT SM pending for the mobile communication device.

8. The method of claim 5, wherein the signaling request message and the signaling response message are a Routing Area Update Request message and a Routing Area Update Accept message, respectively, or a Service Request message and a Service Accept message, respectively.

9. A mobile communication device, comprising:
a wireless transceiver, performing wireless transmission and reception to and from a service network comprising a Serving GPRS (General Packet Radio Service) Support Node (SGSN); and
a controller, transmitting a signaling request message to the SGSN via the wireless transceiver when operating in an idle mode with Extended Discontinuous Reception (EDRX), receiving a signaling response message, which indicates that there is at least one MT SM pending for the mobile communication device, from the SGSN via the wireless transceiver, and staying in an active state for receiving the pending MT SM from the service network via the wireless transceiver, in response to the signaling response message indicating that there is at least one MT SM pending for the mobile communication device.

10. The mobile communication device of claim 9, wherein the signaling request message and the signaling response message are a Routing Area Update Request message and a Routing Area Update Accept message, respectively, or a Service Request message and a Service Accept message, respectively.

11. A method for a mobile communication device operating in an idle mode with Extended Discontinuous Reception (EDRX) to receive a Mobile Terminated (MT) Short Message (SM), the method comprising:
transmitting a signaling request message to a Serving GPRS (General Packet Radio Service) Support Node (SGSN) when operating in the idle mode with EDRX;
receiving a signaling response message, which indicates that there is at least one MT SM pending for the mobile communication device, from the SGSN; and
staying in an active state for receiving the pending MT SM from the service network via the wireless transceiver, in response to the signaling response message indicating that there is at least one MT SM pending for the mobile communication device.

12. The method of claim 11, wherein the signaling request message and the signaling response message are a Routing Area Update Request message and a Routing Area Update Accept message, respectively, or a Service Request message and a Service Accept message, respectively.

* * * * *